(No Model.) 2 Sheets—Sheet 1.
G. HUEBNER.
ROTARY OVEN.
No. 552,838. Patented Jan. 7, 1896.
FIG. I.
FIG. II.
FIG. III.
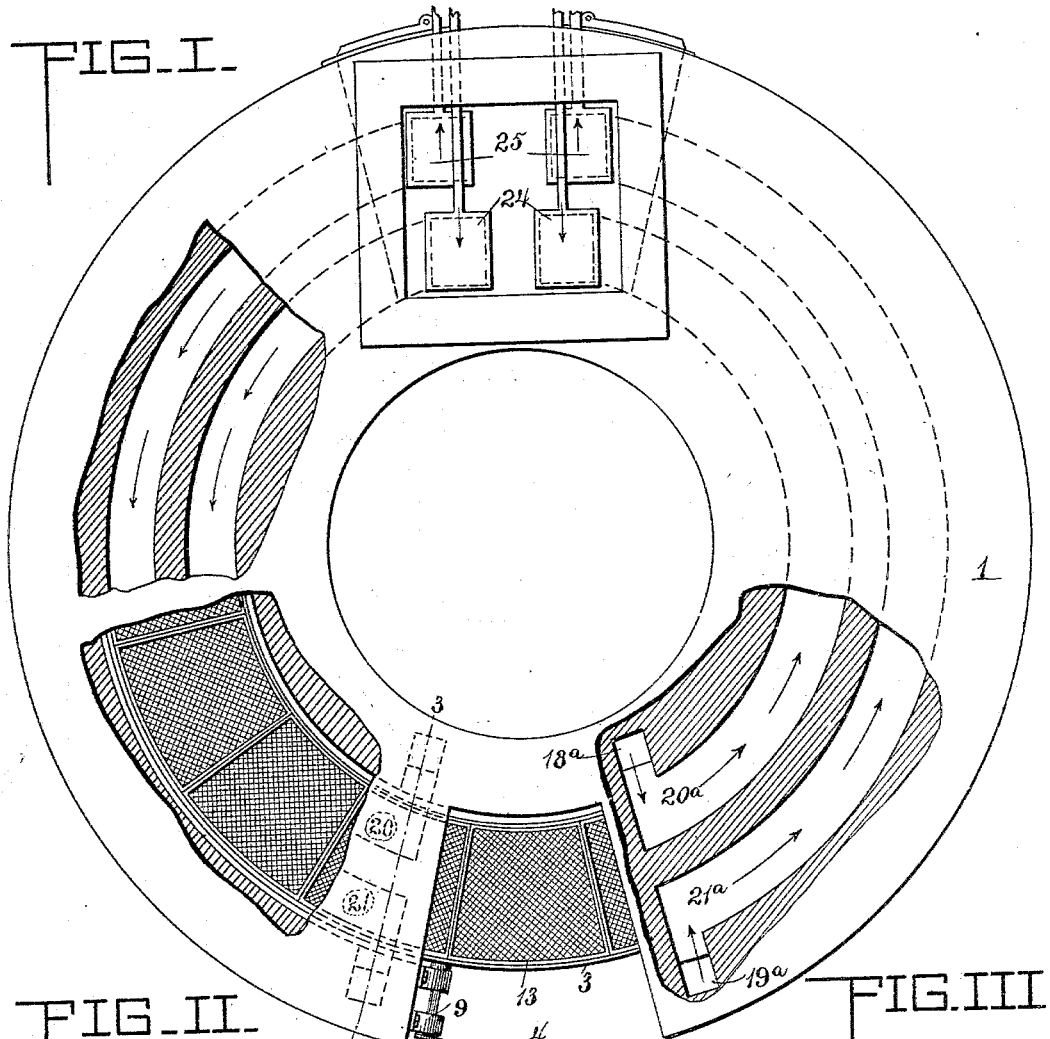
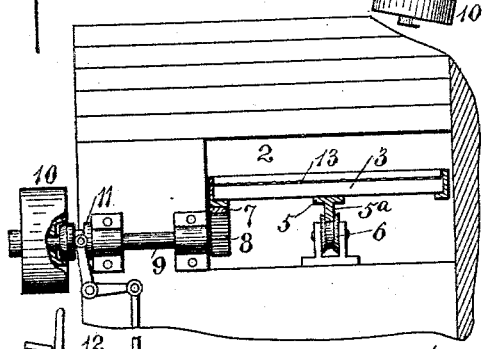
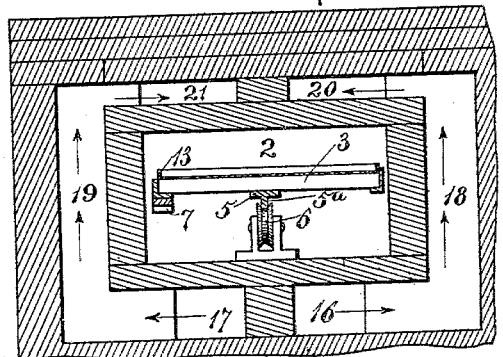
Witnesses: W. Ellwood Allen. Herbert Bradley.
Inventor: George Huebner.
By Knight Bro. Attorneys

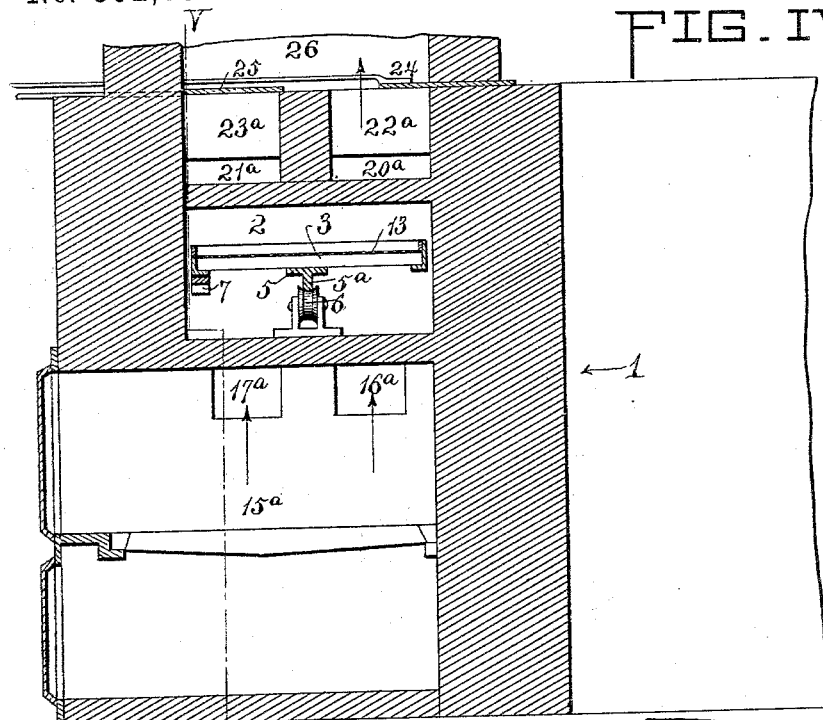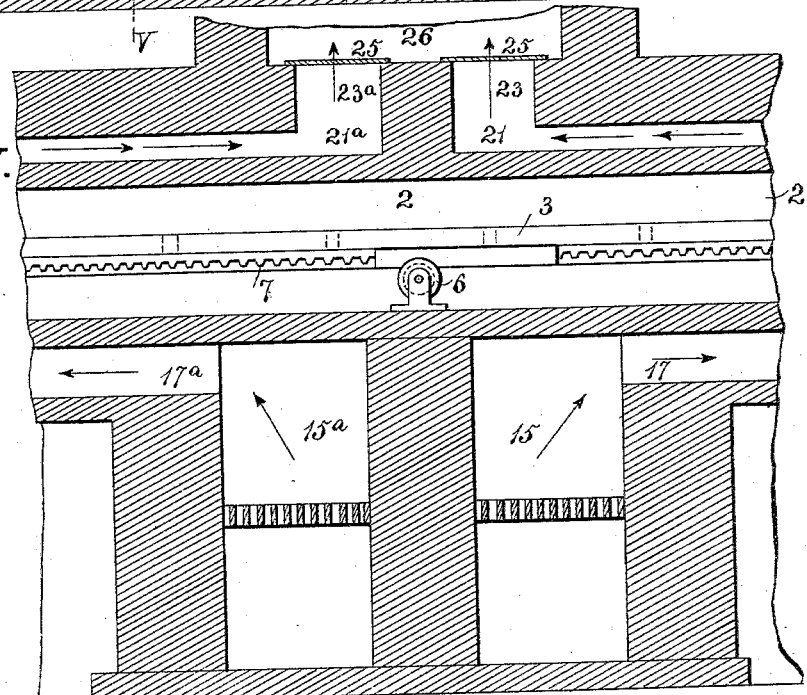

UNITED STATES PATENT OFFICE.

GEORGE HUEBNER, OF ST. LOUIS, MISSOURI.

ROTARY OVEN.

SPECIFICATION forming part of Letters Patent No. 552,838, dated January 7, 1896.

Application filed September 28, 1893. Serial No. 486,740. (No model.)

*To all whom it may concern:*

Be it known that I, GEORGE HUEBNER, of the city of St. Louis, in the State of Missouri, have invented certain new and useful Improvements in Rotary Ovens, of which the following is a specification.

My invention relates to that class of ovens which have an annular baking-compartment and employ an endless carrier for taking the material through the baking-compartment; and my invention consists in providing such an oven with an open working space into which the annular baking-compartment opens, so that the carrier bridges the space and where the operator may stand and load the carrier as it revolves and replace the baked with unbaked material while running in continuous operation.

My invention further consists in certain combinations of heating apparatus with such an oven, whereby the baking-compartment may be kept at proper temperature during operation and regulated at will, as will be hereinafter fully described, and particularly pointed out in the claims.

In the accompanying drawings, Figure I is an irregular sectional plan showing the stack with the four dampered flues leading thereto, a section of two of the inner and outer heating-flues below the baking-compartment, a section of the baking-compartment with carrier therein, the open working space, and a portion of two of the inner and outer return-flues above the working space. Fig. II is a detailed view of one side of the working space, showing driving connections for the carrier. Fig. III is a section on the line III III of Fig. I, showing the lateral uptake-flues for connecting the pairs of lower flues with corresponding upper return-flues. Fig. IV is a radial vertical section through one of the two independent fire-boxes. Fig. V is a section on the line V V of Fig. IV.

1 represents the rotary oven, which may consist of an annular structure of brick or other suitable building material and is built with an annular baking-compartment 2, an endless carrier 3 arranged to revolve within said baking-compartment 2 to carry the material to be baked through the oven, and an open working space 4 into which the baking-compartment 2 opens and which is bridged by said endless carrier in its travel through the baking-compartment, so as to enable the operator to stand at the working space and put on and take off the material to be carried through the oven for baking without interrupting the continuous travel of the carrier.

The endless carrier may be of any suitable well-known construction. It is preferably provided with a central supporting-hoop 5, which has a vertical flange $5^a$ running in grooved pulleys 6, and the carrier may be provided at its periphery with an annular rack 7, which receives a pinion 8 on a shaft 9, on which is also mounted a hand-wheel 10 made fast to or loose at will by a clutch 11 controlled by foot mechanism 12.

While the construction and arrangement just described are found in practice to make a serviceable apparatus, I do not limit my invention to any particular form of carrier.

The carrier may be fitted with segmentally-shaped pans 13, which may be filled with raw material and placed on the carrier until it is full, and rotation continue till the pan first put in has completed a revolution, (or longer if necessary to complete baking,) when the pans are taken off as they come around and replaced by other pans filled with unbaked material. The oven 1 is also constructed with any suitable heater—such, for instance, as like that shown and which employs a double fire-box 15 $15^a$, preferably located diametrically opposite the working space. Leading from each fire-box is an inner heating-flue 16 $16^a$ and an outer heating-flue 17 $17^a$, which said flues extend along underneath the annular baking-compartment as far as the walls of the working space 4, where said flues terminate in lateral uptake-flues 18 19 $18^a$ $19^a$, which lead up to a plane above the top wall of the baking-compartment, and there communicate with return-flues 20 21 $20^a$ $21^a$, which run back above the baking-compartment to points over the fire-boxes, where they discharge through outlets 22 23 $22^a$ $23^a$, controlled by dampers 24 25 into a stack or chimney 26. The dampers 24 slide outward to open the outlets 22 $22^a$, while dampers 25 slide inward to open outlets 23 $23^a$.

The particular arrangement of flues just described is specially adapted for heating an oven formed with a working space into which the baking-compartment opens. The flues are only separated by the thin top and bottom walls of the baking-compartment, and the lateral uptake-flues adjacent to the working space serve to keep the compartment heated in the desired manner. Moreover, the duplicate system of heating apparatus provides for regulating the temperature of the two halves of the oven independently, and in like manner the dampers offer convenient and effective means for regulating the temperature of each side.

Having thus described my invention, the following is what I claim as new therein and desire to secure by Letters Patent:

1. An annular bake-oven comprising a fire box, a baking compartment and a working space, horizontal flues leading from said fire box, lateral up-take flues located adjacent to the working space and in communication with said horizontal flues, additional horizontal flues leading from said up-take flues and in communication with a suitable stack, said baking compartment being located between the solid walls of the horizontal flues and having its terminal ends opening into the working space, substantially as set forth.

2. A rotary bake-oven having an annular baking compartment, a working space substantially as shown, into which the ends of the annular compartment open and a carrier running in said compartment and bridging said working space substantially as and for the purpose set forth.

3. A bake-oven comprising a suitable heating arrangement an annular baking compartment and an endless rotary carrier; said baking compartment being intersected by a vertical working space formed in the wall of the oven and in which the operator may stand to manipulate the oven and said carrier being arranged to bridge said working space as and for the purpose set forth.

GEORGE HUEBNER.

In presence of—
  A. M. EBERSOLE,
  BENJN. A. KNIGHT.